Jan. 25, 1949.    K. L. HANSEN    2,460,006
RECTIFIER AND TRANSFORMER UNIT
Filed Jan. 10, 1944
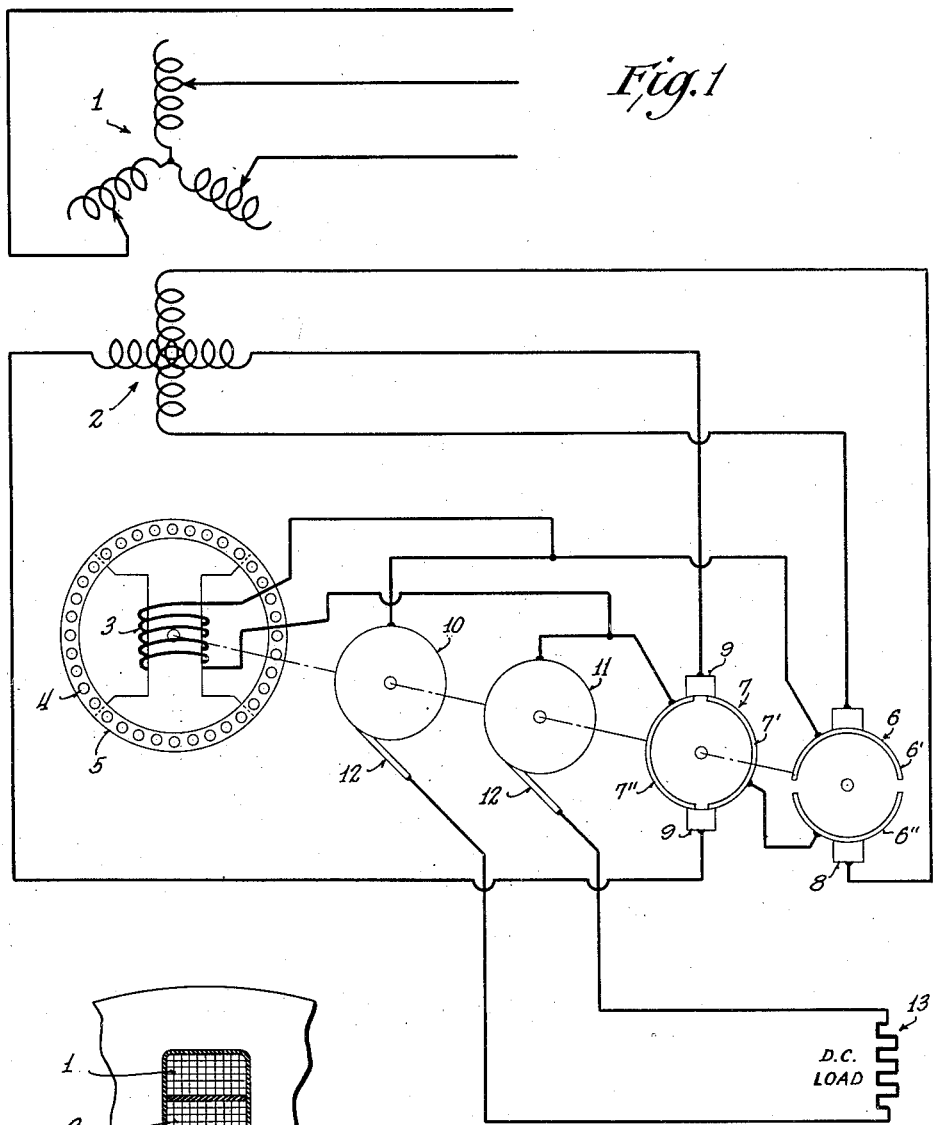
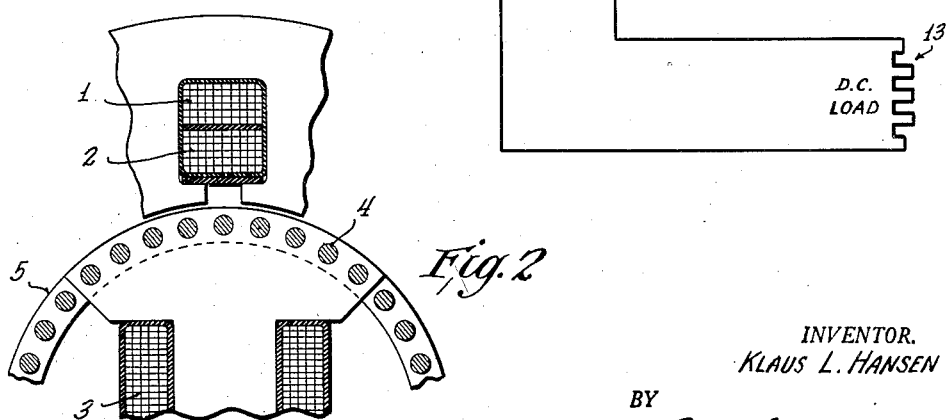
INVENTOR.
KLAUS L. HANSEN
BY
ATTORNEY.

Patented Jan. 25, 1949

2,460,006

UNITED STATES PATENT OFFICE 2,460,006

RECTIFIER AND TRANSFORMER UNIT

Klaus L. Hansen, Milwaukee, Wis.

Application January 10, 1944, Serial No. 517,673

3 Claims. (Cl. 171—123)

This invention relates to a rectifier and transformer unit.

Objects of this invention are to provide a combined transformer and synchronous rectifier which is so made that the device has two main elements constituting a rotor and a stator respectively, one of the elements being a transformer element and having primary and secondary windings, preferably polyphase windings, and the other main element having a direct current winding and a short-circuited winding, the element which constitutes the rotor driving the commutating means for rectifying the alternating current from the secondary of the transformer unit for supplying direct current to a work circuit and to the direct current winding.

In rectification harmonics are usually produced due to the fact that the rectifier is often required to interrupt the alternating current at points different from the zero points. These harmonics, if no provision were made to take care of them, would be reflected back from the secondary through the primary out on the line and would give trouble, particularly if the line were a high impedance line, as they would cause a loss of energy and would be radiated from the line thus producing interference with communication systems.

Further objects are to provide, in a device of the above defined type, a short-circuited tertiary winding closely interlinked with the secondary winding of the transformer and rotated synchronously with the fundamental frequency for which the device is designed.

It has been found that the short-circuited tertiary winding, which is closely interlinked with the secondary winding through which the harmonics pass, offers a low impedance path for the harmonics and produces a magnetic flux in opposition to that produced by the harmonics and prevents generation of high voltage due to the harmonics and prevents reflection of the harmonics back through the transformer unit onto the line and prevents any material waste of energy due to the harmonics. In addition to this it has been found that commutation is also greatly improved.

Further objects of this invention are, therefore, to provide a combined synchronous rectifier and transformer unit which is so made that harmonics generated due to the action of the rectifier find a low impedance path through the secondary winding due to the coaction of the short-circuited tertiary winding with the secondary winding of the transformer and are, therefore, prevented from being sent out on the line, and to so arrange the tertiary circuit that it is rotated in synchronism with the fundamental frequency and does not waste any energy due to the fundamental frequency.

Further objects of this invention are to improve commutation.

Further objects are to provide a synchronous rectifier which is efficient, which is self-starting, and which is of simple construction.

An embodiment of the invention is shown in the accompanying drawings, in which:

Figure 1 is a schematic view showing the combined transformer unit and synchronous rectifier unit.

Figure 2 is a fragmentary view, partly broken away, showing a portion of the stator and rotor with one of the end rings sectioned off.

The device comprises a synchronous motor structure in which the two main elements constituting the stator and the rotor are arranged to respectively provide a transformer unit having primary and secondary windings and a second unit having a direct current winding and a short-circuited winding. The invention has been shown with the transformer unit forming the stator unit and the direct current and short-circuited windings carried by the rotor unit, though this arrangement, of course, could be reversed.

Referring to the drawings, it will be seen that tne stator comprises a primary winding which is preferably polyphase and is indicated by the reference character 1. Preferably this primary winding is a three phase winding and has tapped primaries. The secondary winding is indicated by the reference character 2 and is also preferably a polyphase winding. It may be a two phase winding as shown.

The rotor consists of the direct current winding 3 which is adapted to produce the poles of the rotor. The rotor carries a short-circuited winding which may be in the form of a squirrel cage, the bars being indicated by the reference character 4 and the end rings by the reference character 5. This short-circuited winding constitutes a tertiary winding which, as will be seen as the description proceeds, insures a low impedance path for harmonics, prevents their reflection out onto the line, prevents any material energy loss due to such harmonics and does not absorb energy at the fundamental frequency for which the device is designed and operated. In the schematic showing in the drawings the rotor has been shown as a two-pole rotor, though, of course, the stator and rotor could be formed so as to provide four poles or any number of poles desired. The rotor shaft also carries two commutators indicated generally by the reference characters 6 and 7 each having a pair of segments, indicated at 6' and 6'' and 7' and 7'', respectively. These segments are arranged at right angles to each other. A pair of brushes 8 bear upon the commutator 6 and are connected to opposite sides of one of the two phase windings 2. Similarly a pair of brushes 9 bear on the commutator and are connected to opposite ends of the other of the two phase windings 2. The segments 7' and 6'' are directly electrically connected. The rotor shaft also carries a pair of slip rings 10 and 11 which are connected respectively to the segments 6' and 7''. Brushes 12 bear on the slip rings and are connected to the direct current load circuit 13.

It is preferable to have the short-circuited winding consisting of the bars 4 and the end rings 5 closely coupled with the secondary 2. This is readily accomplished by winding the primary winding 1 in the outer portions of slots in the stator and winding the secondary windings 2 in the inner portions of the slots of the stator. Obviously the primary and secondary windings may be distributed windings or may be formed in any other way desired or may be of the same or of a different number of phases.

By shifting the taps on the primary 1 any desired voltage may be obtained at the brushes 12 for the direct current load circuit.

It is to be noted particularly that the commutators 6 and 7 are connected in series with each other and in series with the direct current winding 3 and consequently furnish direct current to the direct current winding without the necessity of slip rings. Slip rings are employed, however, in order to lead direct current from the rectifier to the load circuit.

It is to be noted that there is a very close interlinking of the secondary winding 2 and the short-circuited tertiary winding of the rotor. Consequently harmonics produced by the synchronous rectifier will be prevented from being transmitted back out onto the line as the short-circuited winding or tertiary winding causes a low impedance path to be offered to these harmonics and at the same time since the short-circuited winding rotates synchronously with reference to the fundamental frequency for which the device is designed, it is apparent that the short-circuited winding will absorb no energy due to that transmitted at the fundamental frequency.

It is apparent that the principle followed in this invention could be used with other types of rectifiers instead of the synchronous rectifier shown for this invention provides a synchronously rotating short-circuited tertiary winding which prevents the reflection of harmonics out onto the line and offers instead a low impedance path for the harmonics and tends to suppress the magnetic flux pulsations in the transformer unit due to the harmonics.

The preferred form of construction has been illustrated in that the stator is preferably the transformer unit and the rotor preferably carries the short-circuited winding and the direct current winding, though, as stated, these two main units could be reversed.

The rectifier may not interrupt the circuit at exactly the zero point and consequently there is a very pronounced tendency to produce harmonics differing, of course, from the fundamental frequency, but inasmuch as this invention provides means whereby a low impedance path is furnished such harmonics, obviously such harmonics do not waste any material portion of the energy supplied the machine and also are not reflected back out onto the line. It is believed that the above points will be better understood when it is considered that at the instant the commutator 7 is commutating, it is also reversing the current flow through its corresponding secondary coil, and, similarly, when the commutator 6 is commutating, it is also reversing the current flow through its corresponding secondary coil. It is clear that by providing the short-circuited tertiary winding, this sudden reversal of current is greatly facilitated and commutation is very much improved.

In addition to this the amount of energy required by the synchronous motor is relatively small in proportion to the amount of energy that is transmitted to the direct current load circuit and consequently the efficiency of the apparatus is high.

It will also be seen that in view of the fact that a rotating field is produced, the device constitutes a self-starting synchronous rectifier.

It will be seen that a very simple combined synchronous rectifier and transformer unit has been provided by this invention which is highly efficient in operation and which does not waste any material amount of energy due to harmonics and prevents the harmonics from being reflected back onto the supply line.

Although this invention has been described in considerable detail, it is to be understood that such description is intended as illustrative rather than limiting, as the invention may be variously embodied and is to be interpreted as claimed.

I claim:

1. A synchronous rectifier and transformer unit comprising a stator constituting a transformer element and having a polyphase primary and a polyphase secondary winding, a rotor having a short-circuited winding and a direct current winding, a direct current load circuit, a plurality of commutators driven from said rotor, brushes connected to said secondary winding and bearing on said commutators, said commutators and said direct current winding being all connected in series, slip rings driven from said rotor and connected to said commutators, and brushes connected to said load circuit and bearing on said slip rings, said commutators, slip rings and load circuit being all connected in series.

2. A synchronous rectifier and transformer unit comprising a stator constituting a transformer element having a three phase primary and a two phase secondary winding, a rotor having a short-circuited winding and a direct current winding, a direct current load circuit, a pair of commutators driven from said rotor, one segment of one commutator being connected to a segment of the other commutator, a pair of brushes bearing on each commutator, the brushes of one commutator being connected to one of the phases of said secondary winding and the brushes of the other commutator being connected to the other phase of said secondary winding, said direct current winding being connected to the unconnected segments of said commutators, a pair of slip rings connected to the unconnected segments of said commutators, and brushes bearing on said slip rings and connected to said load circuit.

3. A synchronous rectifier and transformer unit comprising a stator constituting a transformer element and having a tapped polyphase primary and a polyphase secondary winding, a rotor having a short-circuited winding and a direct current winding, a direct current load circuit, a plurality of commutators driven from said rotor, brushes connected to said secondary winding and bearing on said commutators, said commutators and said direct current winding being all connected in series, slip rings driven from said rotor and connected to said commutators, and brushes connected to said load circuit and bearing on said slip rings, said commutators, slip rings and load circuit being all connected in series.

KLAUS L. HANSEN.

REFERENCES CITED

The following references are of record in the file of this patent:

UNITED STATES PATENTS

| Number | Name | Date |
|---|---|---|
| 477,879 | Wilcox | June 28, 1892 |
| 729,441 | Steinmetz | May 26, 1903 |
| 771,868 | Freedman | Oct. 11, 1904 |
| 890,776 | Leblanc | June 16, 1908 |
| 1,257,979 | Chubb | Mar. 5, 1918 |
| 1,298,695 | Hague | Apr. 1, 1919 |
| 1,337,100 | Stone et al. | Apr. 13, 1920 |
| 1,607,030 | Weichsel | Nov. 16, 1926 |
| 1,617,092 | Yamamoto | Feb. 8, 1927 |
| 1,634,944 | Hull | July 5, 1927 |
| 1,675,677 | Weichsel | July 3, 1928 |
| 1,694,460 | Weichsel | Dec. 11, 1928 |
| 2,228,544 | Wallof | Jan. 14, 1941 |

FOREIGN PATENTS

| Number | Country | Date |
|---|---|---|
| 3,227 | Great Britain | 1913 |